United States Patent
Kohno et al.

(10) Patent No.: US 6,220,090 B1
(45) Date of Patent: Apr. 24, 2001

(54) AIR FLOW METER

(75) Inventors: Yasushi Kohno, Kariya; Ryo Nagasaka, Nagoya; Minoru Kondo, Chiryu; Makoto Tsunekawa, Okazaki; Tomoyuki Takiguchi, Kariya, all of (JP)

(73) Assignee: Denso Corporation (JP)

( * ) Notice: Subject to any disclaimer, the term of this patent is extended or adjusted under 35 U.S.C. 154(b) by 0 days.

(21) Appl. No.: 09/253,539

(22) Filed: Feb. 22, 1999

(30) Foreign Application Priority Data

Mar. 6, 1998 (JP) .................................... 10-054640

(51) Int. Cl.[7] ........................................ G01F 5/00
(52) U.S. Cl. ............................. 73/202; 73/204.22
(58) Field of Search .................... 73/202, 202.5, 73/204.11, 204.22, 204.21, 204.25, 204.27

(56) References Cited

U.S. PATENT DOCUMENTS

| | | | |
|---|---|---|---|
| 3,559,482 | * 2/1971 | Baker et al. | 73/202.5 |
| 4,393,697 | * 7/1983 | Sato et al. | 73/204.27 |
| 5,467,648 | * 11/1995 | Igarashi et al. | 73/202.5 |
| 5,537,870 | 7/1996 | Zurek et al. . | |
| 5,595,163 | * 1/1997 | Nigi et al. | 73/204.21 |
| 5,804,718 | 9/1998 | Nagasaka et al. . | |

FOREIGN PATENT DOCUMENTS

| | | |
|---|---|---|
| 0 803 712 | 10/1997 | (EP) . |
| 6-17810 | 3/1994 | (JP) . |
| 9-43020 | 2/1997 | (JP) . |

* cited by examiner

Primary Examiner—Max Noori
Assistant Examiner—Jagdish Patel
(74) Attorney, Agent, or Firm—Nixon & Vanderhye PC

(57) ABSTRACT

An air flow meter disposed in an intake pipe has a bypass member having a U-shaped bypass passage, into which part of air flowing through the intake pipe is introduced. An outflow port disposed at a downstream air side of the bypass passage is surrounded at its three sides by opposing surfaces of a pair of side walls and a wall surface of a partition wall disposed at "an upstream air side of the outflow port". Further, the outflow port is opened in an air flow direction in the bypass passage and in an air flow direction in the air flow passage. Therefore, air flowing through the bypass passage is partially discharged into the air flow passage through the outflow port gradually before joining main air flow in the air flow passage, thereby restricting decrease in air flow velocity and occurrence of turbulence in the bypass passage.

6 Claims, 7 Drawing Sheets

AIR FLOW →

FIG. 9

AIR FLOW METER

CROSS REFERENCE TO RELATED APPLICATION

This application relates to and incorporates herein by reference Japanese Patent Application No. 10-54640 filed on Mar. 6, 1998.

BACKGROUND OF THE INVENTION

1. Field of the Invention

The present invention relates to an air flow meter which has a bypass passage in an air flow passage and measures air flow amount in the air flow passage by measuring air flow amount in the bypass passage.

2. Related Art

Conventionally, air flow meters having a sensor unit disposed in an air flow passage of an internal combustion engine are well known. These air flow meters measure intake air flow amount of the engine by the sensor unit so that amount of fuel supplied to the engine is controlled with high accuracy.

However, when both frequency and amplitude of intake air pulsation generated by engine operation in the air flow passage of the engine are high, air flow amount in the air flow passage may not be measured accurately due to response delay of the sensor unit or the like. For example, a thermal air flow meter having an exothermic resistor and a temperature sensing resistor as the sensor unit has nonlinear characteristics in which the heat radiation amount of the resistors is in proportion to a square root of air flow velocity Therefore, the thermal air flow meter may detect an air flow velocity smaller than an actual value due to the response delay of the resistors.

To eliminate these detection errors, JP-B2-6-17810, JP-A-8-193863 and JP-A-9-43020 disclose an air flowmeter which has a bypass passage formed in an air flow passage to measure air flow amount in the main air flow passage by measuring air flow amount in the bypass passage through a sensor unit disposed in the bypass passage. In the air flow meter having the bypass passage, pulsation in the bypass passage can be decreased and measurement accuracy of air flow amount can be improved by adjusting a ratio of a length of the bypass passage to a length between an inlet and an outlet of the bypass passage in an air flow direction in the air flow passage.

However, air flowing through the bypass passage and air flowing through the air flow passage collide with each other in a joint portion between the bypass passage and the air flow passage, thereby decreasing air flow velocity in the bypass passage and generating turbulence in the bypass passage. As a result, air flow amount of the air flow passage may not be measured accurately.

SUMMARY OF THE INVENTION

In view of the foregoing problems, it is an object of the present invention to provide a simple-structured air flow meter which reduces the decrease in air flow velocity and the occurrence of turbulence in a bypass passage and measures air flow amount in an air flow passage with high accuracy.

According to the present invention, an air flow meter has a bypass passage having an outflow portion disposed at a downstream air side in the bypass passage. The outflow portion is surrounded at its three sides by a surface disposed at "an upstream air side of the outflow portion in an air flow passage" and a pair of opposing surfaces facing each other in a direction perpendicular to an air flow direction in the air flow passage and to an air flow direction in a downstream passage of the bypass passage, and is opened in the air flow direction in the air flow passage and in the air flow direction in the downstream passage. Therefore, air flowing through the bypass passage is partially discharged through the outflow port toward the downstream air side in the air flow passage gradually, before joining air flow in the air flow passage. As a result, air flow in the bypass passage smoothly joins air flow in the air flow passage. Thus, air is smoothly discharged from the bypass passage to the air flow passage, thereby restricting air flow velocity in the bypass passage from decreasing and decreasing turbulence in the bypass passage. As a result, air flow amount in the air flow passage is measured with high accuracy.

Preferably, the air flow meter has the bypass passage formed into a U-shape. A ratio (L1/L2) of a passage length L1 of the bypass passage to a length L2 between an inlet and an outlet of the bypass passage in an air flow direction in the air flow passage is set as $4.0 \leq L1/L2 \leq 5.8$, so that the bypass passage length L1 can be shortened.

BRIEF DESCRIPTION OF THE DRAWINGS

Other objects, features and advantages of the present invention will become more apparent from the following detailed description made with reference to the accompanying drawings. In the drawings.

DETAILED DESCRIPTION OF THE PREFERRED EMBODIMENT

Embodiments of the present invention will be described in more detail with reference to the accompanying drawings.

First Embodiment

Figure 1:
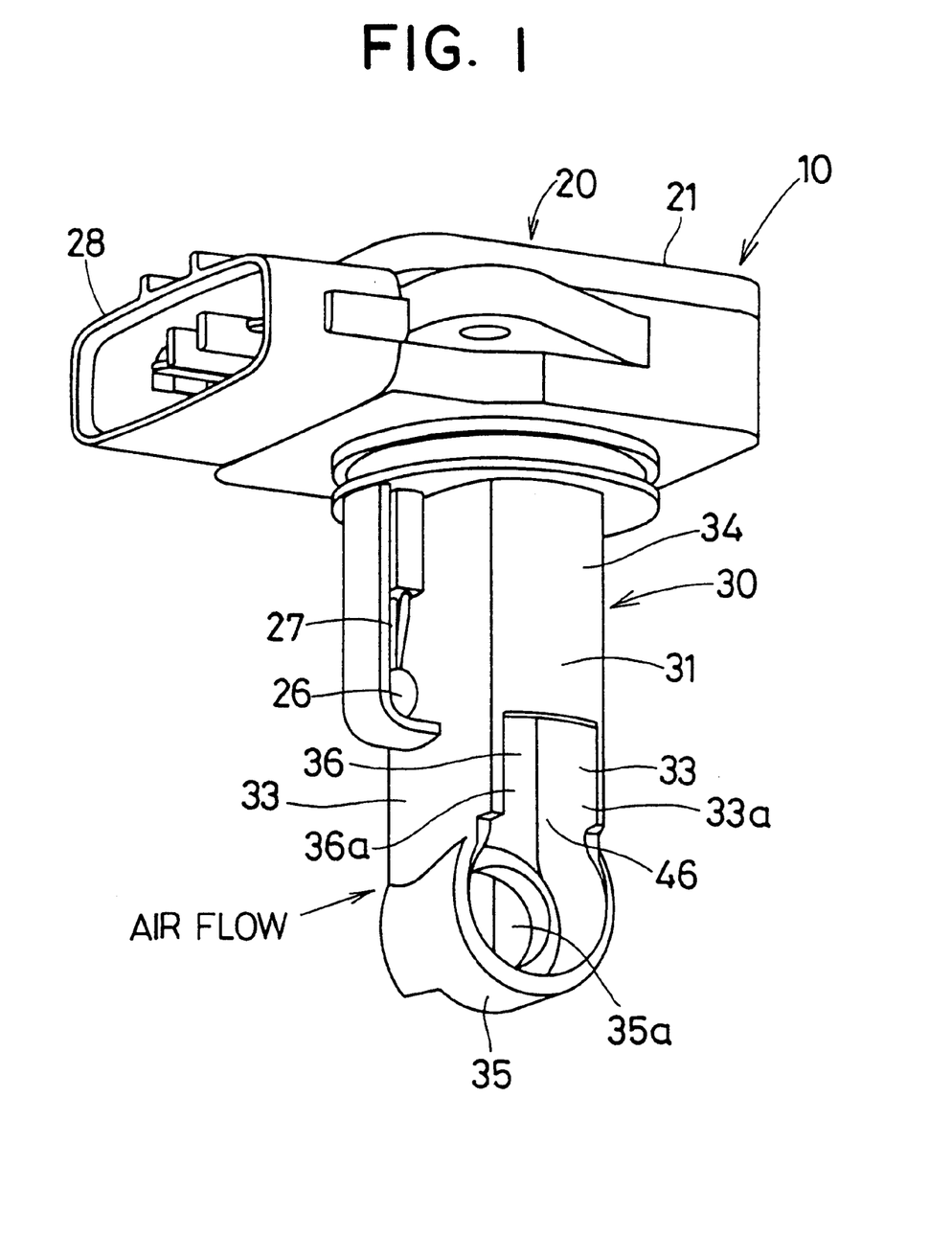
FIG. 1 is a perspective view showing an air flow meter according to a first embodiment of the present invention.
Figure 2:
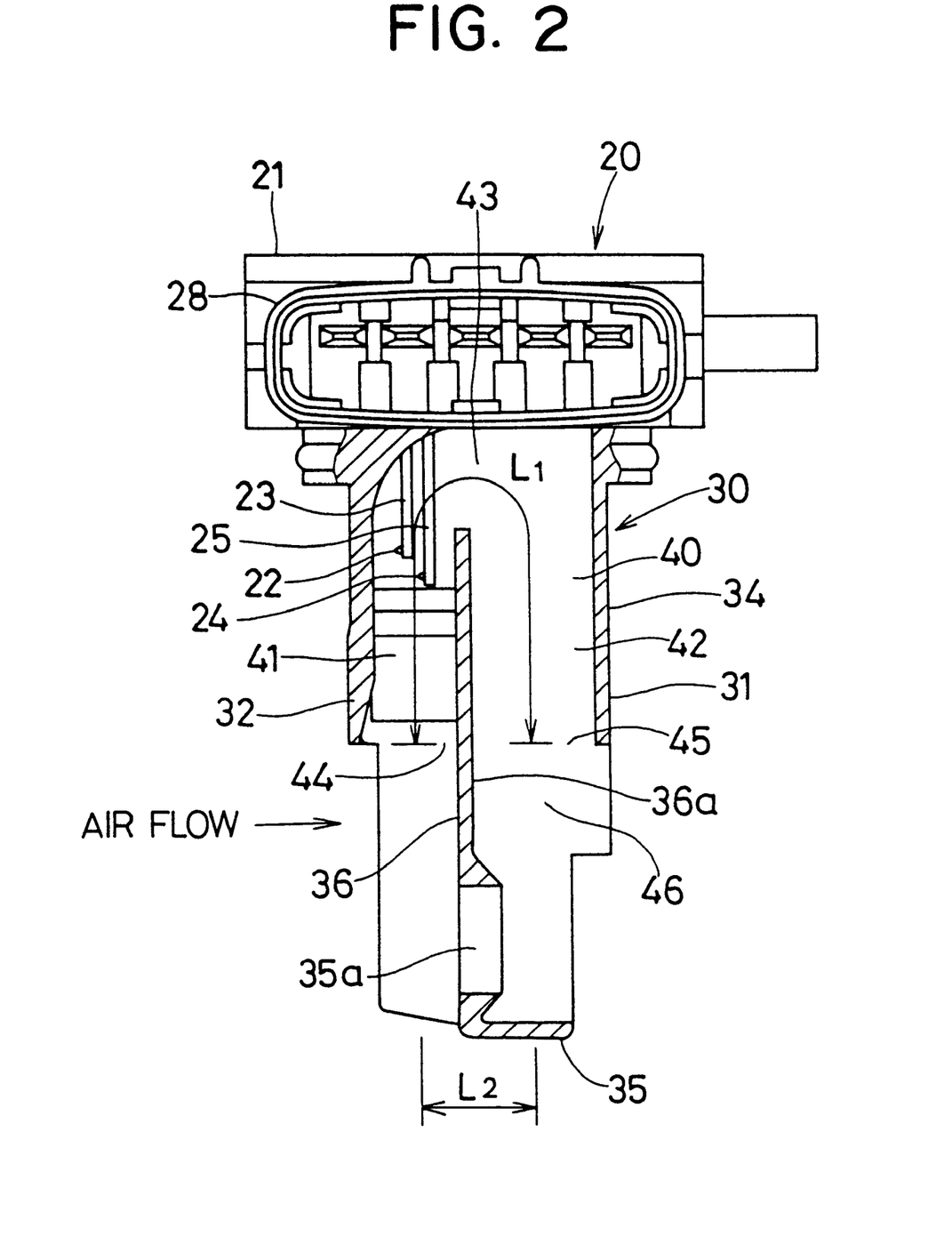
FIG. 2 is a cross-sectional view showing the air flow meter according to the first embodiment.

In FIGS. 1, 2 showing a first embodiment of the present invention, an air flow meter 10 is disposed in, for example, an intake pipe 1 of an internal combustion engine, and measures air flow amount of air flowing through an air flow passage formed by the intake pipe to be supplied to the engine.

The air flow meter 10 comprises a circuit module 20 for measuring air flow amount and a bypass member 30. The circuit module 20 and the bypass member 30 are connected with each other through bonding or welding.

The circuit module 20 has a circuit portion 21 protruding outside the intake pipe and a sensor unit. The sensor unit has a temperature sensing resistor 22 and an exothermic resistor 24. Further, the circuit module 20 has a thermistor 26 as an air temperature measuring element for measuring air temperature in the intake pipe.

A control circuit (not shown) accommodated in the circuit portion 21 is electrically connected with the temperature sensing resistor 22, the exothermic resistor 24 and the thermistor 26 through supporting members 23, 25, 27. The control circuit controls power supply to the temperature sensing resistor 22 and the exothermic resistor 24, and outputs from a connector 28 a detection signal of air flow amount detected by the temperature sensing resistor 22 and the exothermic resistor 24 according to air flow amount in a bypass passage 40 (described later) and a detection signal of air temperature detected by the thermistor 26 (FIG. 1).

The temperature sensing resistor 22 and the exothermic resistor 24 are disposed in the vicinity of a communication portion between an upstream passage 41 and a communication passage 43 of the bypass passage 40. The temperature sensing resistor 22 measures temperature of air, which has contacted with the exothermic resistor 24. Therefore, preferably, the temperature sensing resistor 22 is disposed adjacent to the exothermic resistor 24 to such an extent that the temperature sensing resistor 22 is not affected by heat radiation of the exothermic resistor 24.

The circuit portion 21 controls amount of electric current to be supplied to the exothermic resistor 24 so that difference between temperature of the exothermic resistor 24 calculated from amount of electric current to be supplied to the exothermic resistor 24, and air temperature detected by the temperature sensing resistor 22 becomes constant, and outputs the controlled amount of electric current as an air flow amount detection signal.

The bypass member 30 has an outer tube 31, a venturi tube 35 disposed at a bottom part of the outer tube 31 to be opposite to the circuit portion 21, and a partition wall 36 extending from the venturi tube 35 toward the circuit portion 21. The outer tube 31, the venturi tube 35 and the partition wall 36 are integrally formed to provide the bypass member 30. The outer tube 31 has an upstream wall 32, a downstream wall 34 facing the upstream wall 32 with the partition wall 36 therebetween, and a pair of side walls 33 for connecting the upstream wall 32 and the downstream wall 34. The side walls 33 and the venturi tube 35 are disposed in parallel with an air flow direction in the air flow passage. Each of the side walls 33 has a facing surface 33a. The facing surfaces 33a face each other in a direction perpendicular to the air flow direction in the air flow passage and to an air flow direction in the downstream passage 42. The venturi tube 35 has a venturi passage 35a through which part of air flowing through the air passage flows.

The bypass passage 40 is formed by an inner wall of the outer tube 31 and the partition wall 36. The bypass passage 40 is partitioned by the partition wall 36 into the upstream passage 41 and the downstream passage 42. The bypass passage 40 is formed into U-shape including the upstream passage 41, the communication passage 43 and the downstream passage 42. The upstream passage 41 and the downstream passage 42 are formed parallel with each other and perpendicular to the air flow direction in the air flow passage, and are communicated with each other through the communication passage 43. A direction of air flowing from the upstream passage 41 to the downstream passage 42 changes at the communication passage 43. Air flowing into the bypass passage 40 through an inlet 44 of the bypass passage 40 flows through the upstream passage 41, the communication passage 43, the downstream passage 42 and an outlet 45 of the bypass passage 40 disposed at a downstream end portion of the downstream passage 42, and is discharged from an outflow port 46 to the air flow passage.

The outflow port 46 is disposed at a downstream air side of the downstream passage 42, and is communicated with the downstream passage 42. The outflow port 46 is surrounded at its three sides by the opposing surfaces 33a of the side walls 33 and a wall surface 36a of the partition wall 36 disposed at an upstream air side of the outflow port 46 in the air flow passage. Further, the outflow port 46 is opened in an air flow direction in the downstream passage 42 and in the air flow direction in the air flow passage. Air flowing through the bypass passage 40 is discharged through these two openings of the outflow port 46 into the air flow passage.

A length of the downstream wall 34 is determined so that a ratio of a passage length L1 of the bypass passage 40 to a length L2 between the inlet 44 and outlet 45 of the bypass passage 40 in the air flow direction in the air flow passage is $4.0 \leq L1/L2 \leq 5.8$. The length L1 represents a length of the bypass passage 40 from the inlet 44 to the outlet 45 at a center of the bypass passage 40. That is, the length L1 represents a length from an end of the upstream wall 32 to an end of the downstream wall 34. The length L2 represents a length between a center of the inlet 44 and a center of the outlet 45 in the air flow direction in the air flow passage.

A cross-sectional area of the upstream passage 41 is smaller than that of the downstream passage 42. Therefore, air flow velocity in the upstream passage 41 is larger than that in the downstream passage 42. As mentioned above, the temperature sensing resistor 22 and the exothermic resistor 24 are disposed in the vicinity of the communication portion between the upstream passage 41 and the communication passage 43, where air flow velocity is relatively large. Therefore, air flow amount can be detected by the temperature sensing resistor 22 and the exothermic resistor 24 with high accuracy, so that air flow amount is measured with high accuracy according to the detection signals.

Next, operation of the air flow meter 10 will be described.

Figure 3A:
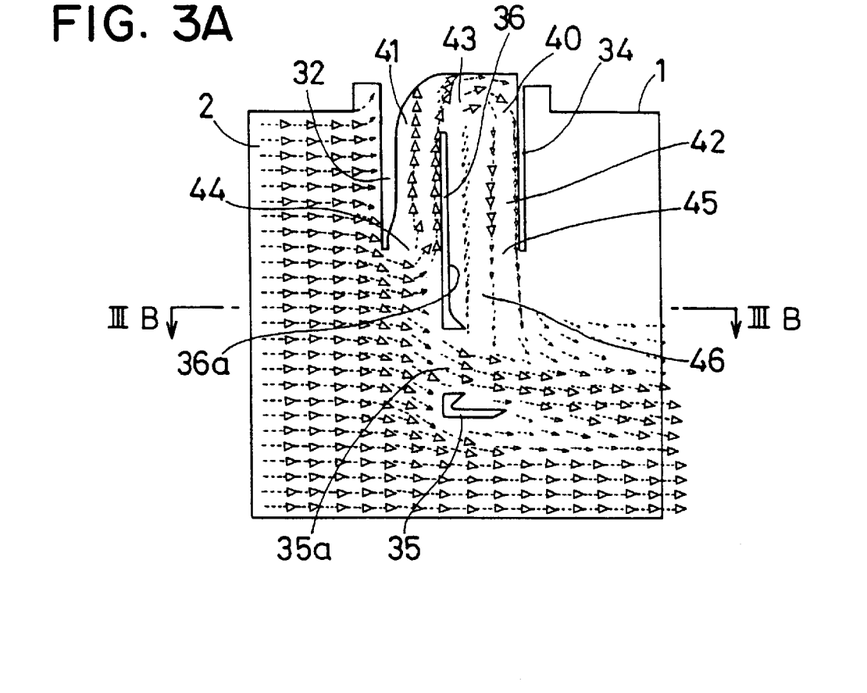
FIG. 3A is a diagram showing a three-dimensional numerical analysis simulation of air flow according to the first embodiment.
Figure 3B:
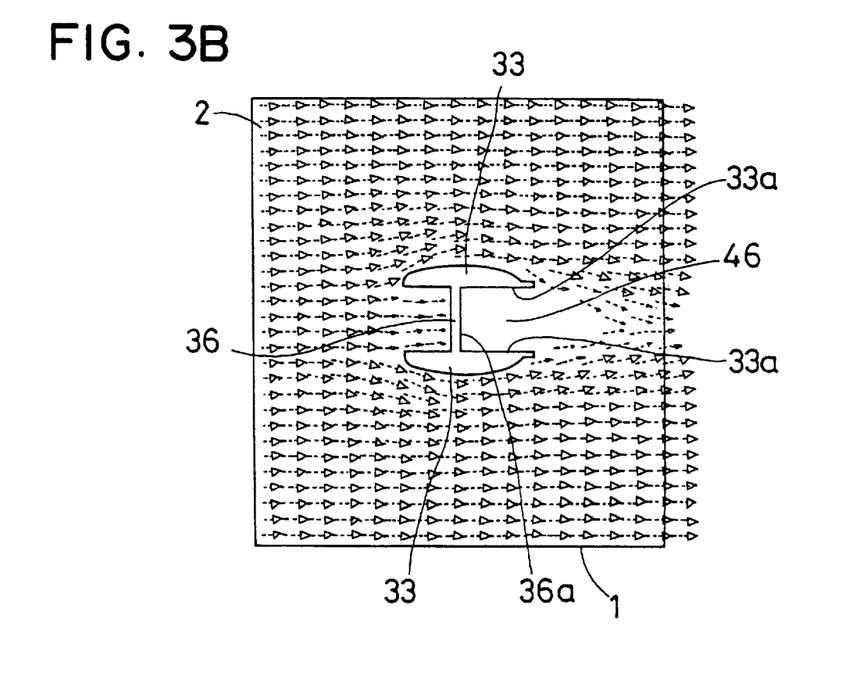
FIG. 3B is a cross-sectional view taken along line IIIB—IIIB in FIG. 3A.

As shown in FIGS. 3A, 3B, air flowing into the bypass passage 40 from the air flow passage 2 formed in the intake pipe 1 separately flows into either the upstream passage 41 of the bypass passage 40 or the venturi passage 35a of the venturi pipe 35. Air flowing through the upstream passage 41 flows through the communication passage 43 and then through the downstream passage 42. Since air flow velocity is increased at the downstream air side of the venturi pipe 35, negative pressure is generated at the downstream air side of the venturi pipe 35. Air flowing through the bypass passage 40 is drawn by this negative pressure, so that air flow velocity in the bypass passage 40 is increased.

A part of air flowing from the downstream passage 42 into the outflow port 46 directly joins in the main air flow discharged from the venturi passage 35a at the downstream air side of the venturi pipe 35 to be discharged from the outflow port 46 into the air flow passage 2. On the other hand, another part of air flowing from the downstream passage 42 into the outflow port 46 is discharged toward the downstream air side in the air flow passage 2 before joining in the main air flow discharged from the venturi passage 35a, because the outflow port 46 is closed by the partition wall 36 at the upstream air side in the air flow passage 2 and is opened at the downstream air side in the air flow passage 2.

Figure 4:
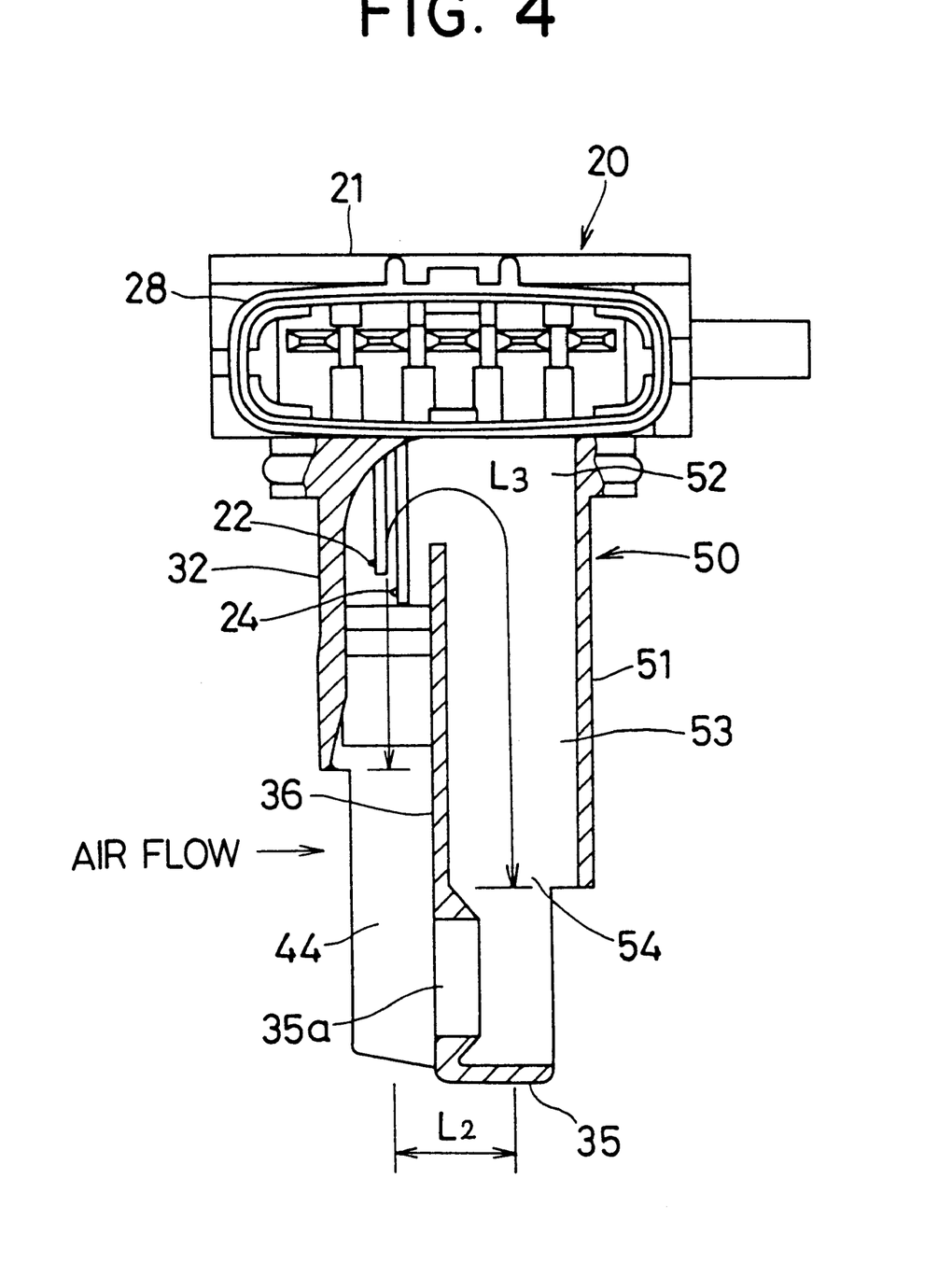
FIG. 4 is a cross-sectional view showing an air flow meter according to a comparative example in the first embodiment.

Next, a comparative example for the first embodiment will be described with reference to FIG. 4. In the comparative example, a downstream wall 51 of an outer tube 50 extends to an upper end of the venturi tube 35. Therefore, an outlet 54 of a bypass passage 52 is opened only in an air flow direction of a downstream passage 53, and is not opened in an air flow direction of the air flow passage. That is, L1/L2<L3/L2.

Figure 5A:
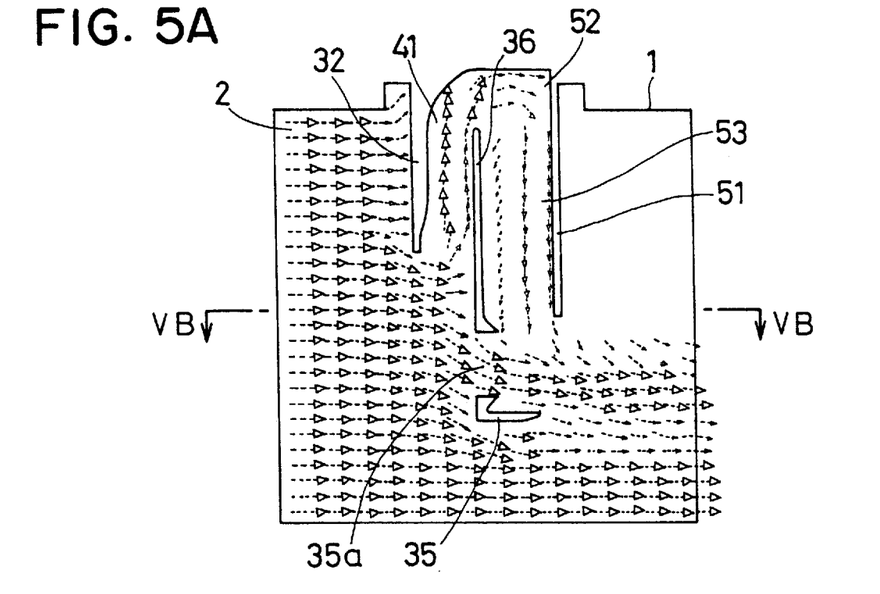
FIG. 5A is a diagram showing a three-dimensional numerical analysis simulation of air flow according to the comparative example.
Figure 5B:
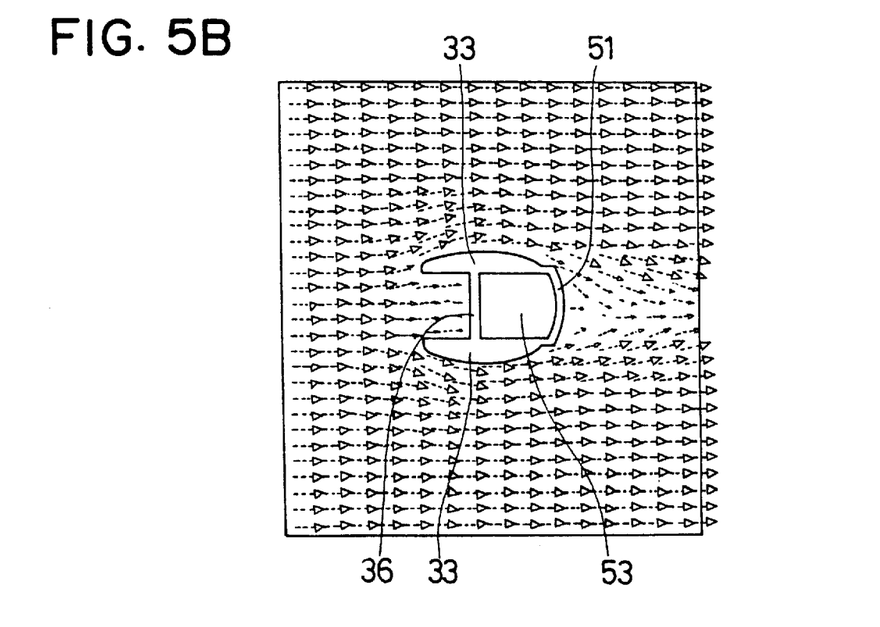
FIG. 5B is a cross-sectional view taken along line VB-VB in FIG. 5A.

As shown in FIGS. 5A, 5B, in the comparative example, most of air discharged from the outlet 54 directly joins in air flowing in the air flow passage at a downstream air side of the venturi passage 35a. Therefore, air is restricted from being smoothly discharged from the bypass passage 52, thereby decreasing air flow velocity in the bypass passage 52 and generating turbulence in the bypass passage 52.

Figure 6:
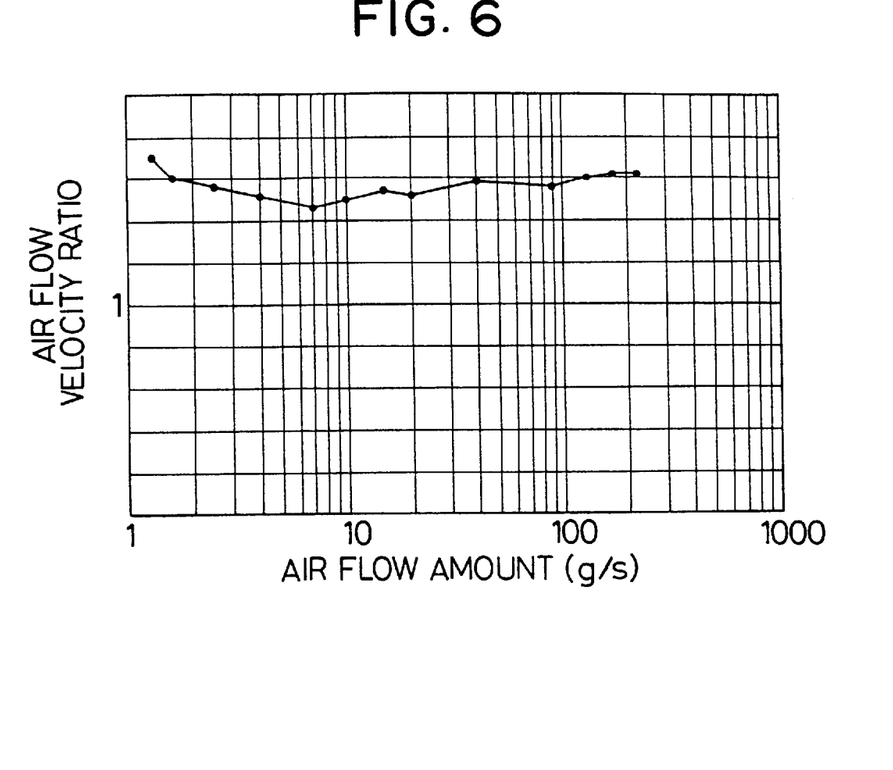
FIG. 6 is a characteristic diagram showing a relationship between an air flow amount and an air flow velocity ratio of air flow velocity in the first embodiment to air flow velocity in the comparative example.

On the other hand, in the first embodiment, the outflow port 46 is opened not only at the downstream air side of the downstream passage 42 but also at the downstream air side of the air flow passage 2. Therefore, air is gradually discharged into the air flow passage 2 while flowing under the downstream wall 34, before joining in main air flow from the venturi passage 35a. As a result, air flow from the bypass passage 40 smoothly joins in main air flow from the venturi passage 35a in the air flow passage. As shown in FIG. 6, air flow velocity in the bypass passage 52 in the first embodiment is larger than that in the comparative example regardless of air flow amount in the air flow passage. In FIG. 6, the air flow velocity ratio represents a ratio of the air flow velocity in the bypass passage 40 in the first embodiment to the air flow velocity in the bypass passage 52 in the comparative example.

Figure 7:
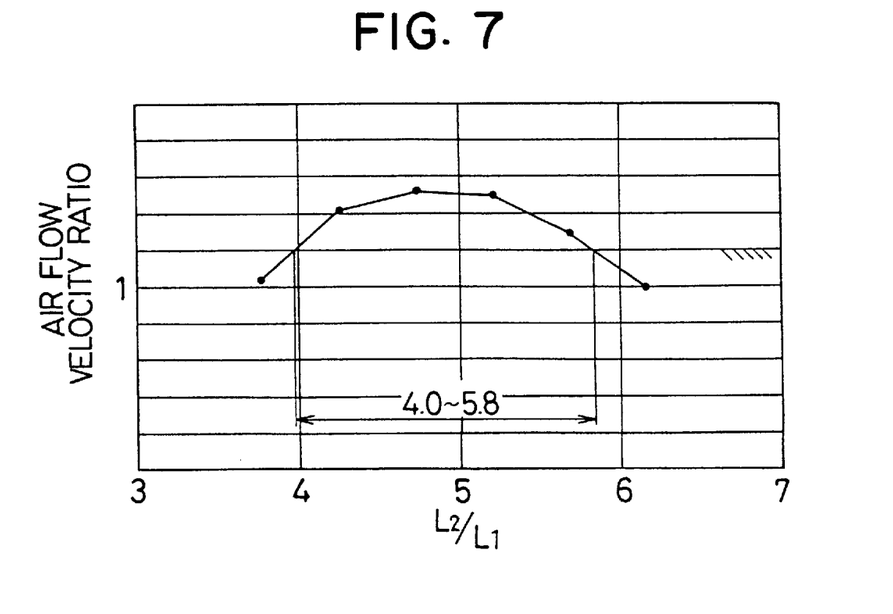
FIG. 7 is a characteristic diagram showing a relationship between a ratio of length of a bypass passage to distance between an inlet and an outlet of the bypass passage, and an air flow velocity ratio of air flow velocity in the first embodiment to air flow velocity in the comparative example.

Further, in the first embodiment, pulsation generated in the bypass passage 40 can be decreased by adjusting L1 and L2 so that L1/L2 is defined as $4.0 \leq L2/L1 \leq 5.8$. Further, a passage length of the downstream passage 42 is held under a predetermined value. Therefore, air flowing from the upstream passage 41 to the downstream passage 42 while changing its air flow direction includes air flowing in the air flow direction in the venturi tube 35, when joining in air flow from the venturi tube 35. As a result, air flow from the bypass passage 40 and air flow from the venturi passage 35a join together smoothly. Further, air flow in the bypass passage 40 is drawn by negative pressure generated at the downstream air side of the venturi pipe 35. Therefore, as shown in FIG. 7, air flow velocity in the bypass passage in the first embodiment is increased in comparison with that in the comparative example, provided that air flow amount in the air flow passage in the first embodiment is the same as that in the comparative example.

Second Embodiment

Figure 8:
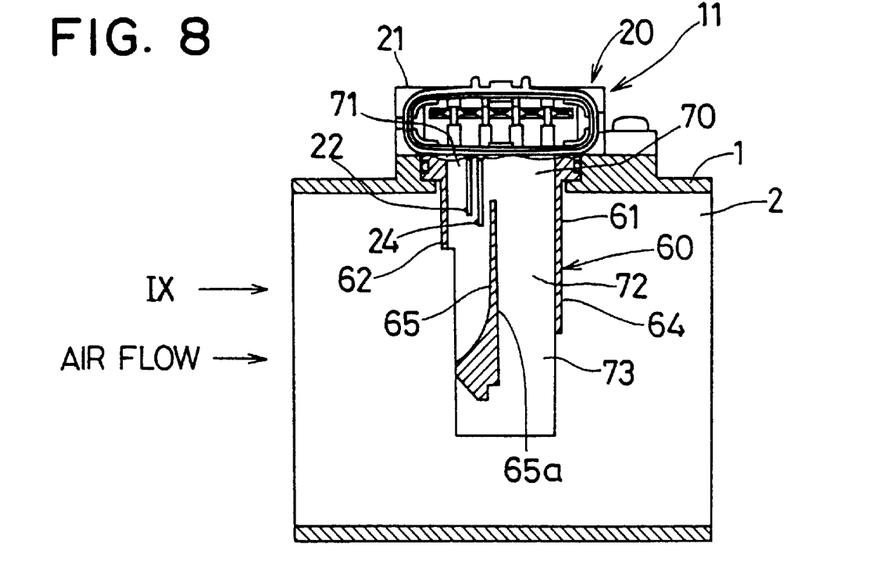
FIG. 8 is a cross-sectional view showing an air flow meter according to a second embodiment of the present invention.
Figure 9:
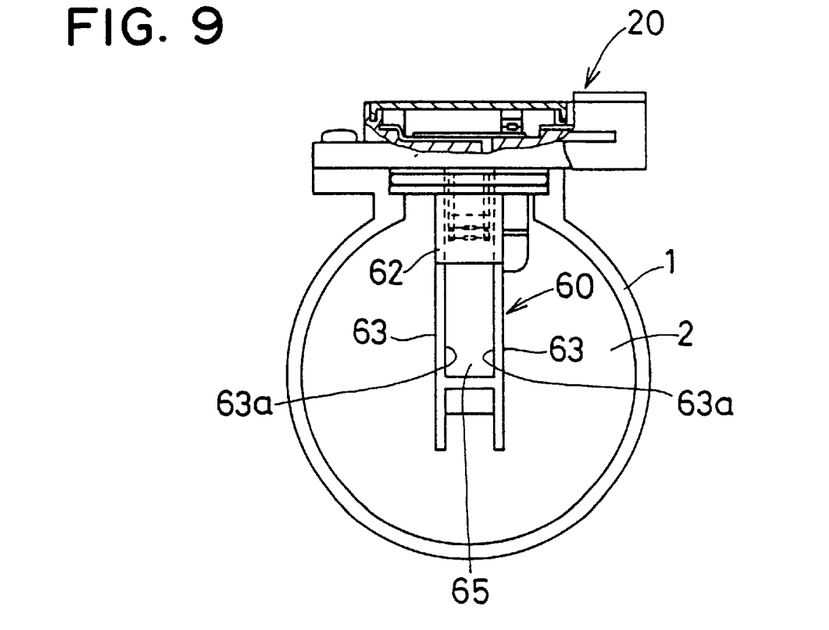
FIG. 9 is a schematic view taken in an arrow direction IX in FIG. 8.

In a second embodiment of the present invention shown in FIGS. 8, 9, an air flow meter 11 has a bypass member 60 having an outer tube 61 and a partition wall 65. The outer tube 61 has an upstream wall 62, a downstream wall 64 facing the upstream wall 62 with the partition wall 65 therebetween, and side walls 63 for connecting the upstream wall 62 and the downstream wall 64. The partition wall 65 partitions the bypass passage 70 into an upstream passage 71 and a downstream passage 72.

An outflow port 73 is communicated with the downstream passage 72 and is disposed at a downstream air side of the downstream passage 72. Further, the outflow port 73 is surrounded at its three sides by opposing surfaces 63a of the side walls 63 and an inner wall surface 65a of the partition wall 65. The inner wall surface 65a is disposed at an upstream air side of the outflow port 73. The outflow port 73 is opened in an air flow direction in the downstream passage 72 and in an air flow direction in the air flow passage 2, so that air flowing through the bypass passage 70 is discharged through these two openings.

In the second embodiment, the bypass member 60 does not have a venturi tube. Therefore, air flow velocity in the bypass passage 70 is smaller than in the first embodiment. However, air is gradually discharged from the outflow port 73 into the air flow passage 2, thereby restricting air flow velocity in the bypass passage from decreasing and decreasing turbulence in the bypass passage.

In the above-mentioned embodiments of the present invention, the outflow port of the bypass passage is closed at the upstream air side by the partition wall, and is opened in the air flow direction of the downstream passage and in the air flow direction of the air flow passage. Therefore, air flowing through the bypass passage is gradually discharged through the outflow port into the air flow passage before joining in the main air flow in the air flow passage. As a result, air flow in the bypass passage smoothly joins in the main air flow in the air flow passage, thereby restricting air flow velocity in the bypass passage from decreasing and decreasing turbulence in the bypass passage. Therefore, the sensor unit detects air flow amount in the bypass passage with high accuracy.

In the above-mentioned embodiments, the bypass passage has a substantially square-shapedcross-section. However, the bypass passage may have a cross-section of any other shapes, such as a circle.

The present invention is not limited to a device for measuring air flow amount for an internal combustion engine, but may be applied to a device for measuring air flow amount in various air flow passages.

What is claimed is:

1. An air flow meter assembly comprising:
   a main air flow passage;
   a bypass member disposed in said main air flow passage, said bypass member defining a bypass passage for bypassing a portion of air flowing through said main air flow passage; and
   a sensor unit disposed in said bypass passage for detecting an air flow amount in said bypass passage, wherein said bypass passage includes:
   an inflow port;
   an upstream passage in flow communication in said inflow port and the sensor unit is disposed in said upstream passage;
   a downstream passage in flow communication with said upstream passage and disposed downstream thereof with respect to a direction of air flow in said bypass passage, said downstream passage being defined by a partition wall on an upstream side thereof with respect to an air flow direction in said main air flow passage, a downstream wall on a downstream side thereof with respect to said main passage air flow direction, and opposing side walls facing each other in a direction perpendicular to said main passage air flow direction; and an outflow port in flow communication with said downstream passage and disposed at a downstream side thereof with respect to said bypass passage air flow direction, said outflow port being defined on three sides by said partition wall and said opposing side walls, said downstream wall extending in a direction of air flow in said downstream passage a distance less than a distance that each of said partition wall and said opposing side walls extend in said downstream passage air flow direction, wherein said outflow port is open in said downstream passage air flow direction and open in said main passage air flow direction so that air flows in the outflow port both in parallel with and perpendicular to the main passage air flow direction and in parallel with and perpendicular to the downstream passage air flow direction, wherein the bypass portion of the air that is flowing in the bypass passage gradually merges with the air flowing in the main air flow passage.

2. An air flow meter assembly according to claim 1, wherein:
said bypass passage including said upstream passage and said downstream passage is formed into a U-shape.

3. The air flow meter assembly according to claim 2, wherein a ratio of a length (L1) of said bypass passage from said inflow port to said outflow port to a length (L2) between said inflow port and said outflow port in said main passage air flow direction is defined as $4.0 \leq L1/L2 \leq 5.8$.

4. The air flow meter according to claim 1, wherein said partition wall is disposed between said upstream passage and said downstream passage and wherein said upstream passage is defined between an upstream wall on an upstream side thereof with respect to said main passage air flow direction and said partition wall.

5. The air flow meter according to claim 4, wherein said upstream wall has a length in a direction perpendicular to said main passage air flow direction and parallel to said downstream passage air flow direction generally equal to a length of said downstream wall in said downstream passage air flow direction.

6. the air flow meter assembly according to claim 1, wherein the bypass member further includes a venturi passage provided at a longitudinal end of said partition wall for drawing air through said bypass passage.

* * * * *